United States Patent [19]
Kawamoto

[11] Patent Number: 6,151,457
[45] Date of Patent: Nov. 21, 2000

[54] IMAGE FORMING SYSTEM FOR DIAGNOSING COMMUNICATION INTERFACE BETWEEN IMAGE FORMING APPARATUSES

[75] Inventor: Hiroyuki Kawamoto, Kanagawa, Japan

[73] Assignee: Ricoh Company, Ltd., Tokyo, Japan

[21] Appl. No.: 09/204,162

[22] Filed: Dec. 3, 1998

[30] Foreign Application Priority Data

Dec. 8, 1997 [JP] Japan ................................ 9-356204

[51] Int. Cl.$^7$ .............................. G03G 15/00; H04N 1/00
[52] U.S. Cl. ................................. 399/9; 358/1.14
[58] Field of Search .................... 399/8, 9; 358/1.14, 358/1.15, 504, 406, 443, 1.13; 714/36, 715, 716, 43, 44

[56] References Cited

U.S. PATENT DOCUMENTS

| | | | |
|---|---|---|---|
| 4,860,111 | 8/1989 | Shimizu et al. | 358/400 |
| 5,175,633 | 12/1992 | Saito et al. | 358/406 |
| 5,889,864 | 3/1999 | Smith et al. | 713/170 |
| 5,901,276 | 5/1999 | Murahashi et al. | 358/1.13 |

FOREIGN PATENT DOCUMENTS

| | | |
|---|---|---|
| 2-60277 | 2/1990 | Japan . |
| 4-318754 | 11/1992 | Japan . |
| 9-168073 | 6/1997 | Japan . |

*Primary Examiner*—Joan Pendegrass
*Attorney, Agent, or Firm*—Oblon, Spivak, McClelland, Maier & Neustadt, P.C.

[57] ABSTRACT

In an image forming system including a plurality of image forming apparatuses, a malfunction in a transmission interface of each image forming apparatus can be recognized before a transmission of image data is performed and a malfunctioning position can be easily specified. Each image forming apparatus includes an interface unit transmitting encoded image data and also receiving image data from a remote image forming apparatus. The image forming apparatuses are connected by a transmission path so that the encoded image data is transmitted therebetween. The interface unit is subjected to a diagnosis operation when a power of each image forming apparatus is turned on.

13 Claims, 11 Drawing Sheets

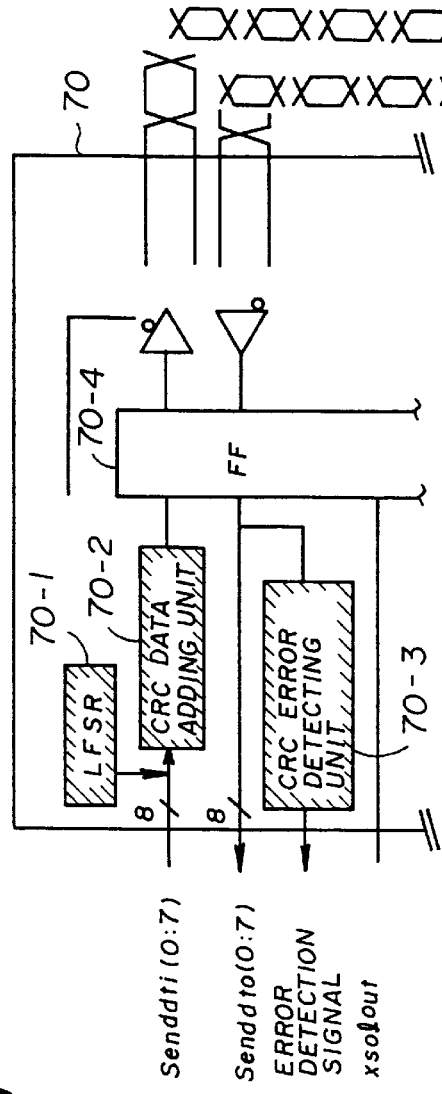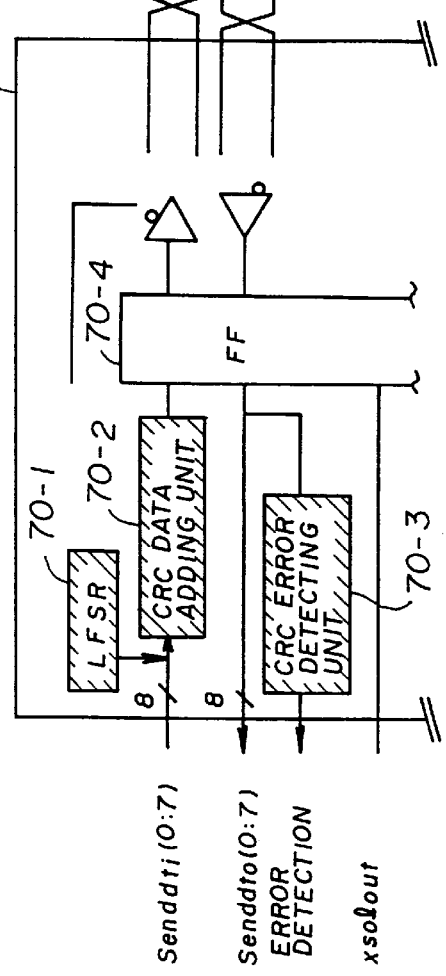
FIG. 10

IMAGE FORMING SYSTEM FOR DIAGNOSING COMMUNICATION INTERFACE BETWEEN IMAGE FORMING APPARATUSES

BACKGROUND OF THE INVENTION

1. Field of the Invention

The present invention generally relates to an image forming system and, more particularly, to an image forming system in which a plurality of image forming apparatuses such as digital copy machines are connected by a transmission path to transmit image data therebetween.

2. Description of the Related Art

Conventionally, an image forming system which increases a processing speed by connecting a plurality of image forming apparatuses such as copy machines is used. In such a conventional image forming system, image data is transmitted between the copy machines by using either a method in which uncompressed raw image data is transferred together with a main-scanning gate signal and a sub-scanning gate signal or a method in which image data to be transmitted is subjected to a variable-length encoding similar to a facsimile apparatus and thereafter the encoded image data is transmitted by a packet communication.

For example, Japanese Laid-Open Patent Application No. 2-60277 discloses a technique in which image data obtained by scanning is temporarily stored in a memory without being processed, and thereafter the image data is distributed to peripheral devices via an interface such as an SCSI.

In the above-mentioned image forming system, a malfunction may be found at a time when a copying operation is performed in a state in which one copy machine is connected to another copy machine. In such a case, a position in which the malfunction occurs cannot be specified.

In order to eliminate such a problem, a malfunction diagnosis may be performed when a power of each image forming apparatus such as a copy machine in the image forming system is turned on. However, in such a method, a transmission line between the image forming apparatuses is not checked. Accordingly, a malfunction of the transmission line may be found at a time when image data is transmitted through the transmission line for performing, for example, a copying operation in a connecting mode in which image data is transferred from one copy machine to another copy machine.

The image forming system mentioned above is generally designed for office use. Accordingly, it is always possible that a malfunction occurs in the transmission line such as a transmission cable connecting the image forming apparatuses.

SUMMARY OF THE INVENTION

It is a general object of the present invention to provide an improved and useful image forming system in which the above-mentioned problems are eliminated.

A more specific object of the present invention is to provide an image forming system in which a malfunction in a transmission interface of each image forming apparatus can be recognized before a transmission of image data is performed and a malfunctioning position can be specified.

Another object of the present invention is to provide an image forming apparatus in which a transmission path between image forming apparatuses can be previously checked.

A further object of the present invention is to provide an image forming system in which a test for transmitting image data between image forming apparatuses can be performed in a short time.

In order to achieve the above-mentioned objects, there is provided according to the present invention an image forming system comprising a plurality of image forming apparatuses. Each image forming apparatus includes an image scanner that scans in an original document so as to generate image data, an image processing unit for processing the image data, an encoding unit to encode the processed image data, an interface unit that transmits the encoded image data and receives image data from other image froming apparatuses, a memory unit for storing the encoded image data received by the interface unit, a decoding unit to decode the encoded image data stored in the memory unit, and a printing unit for printing the decoded image data. The system also comprises a transmission path that connects the interface units of each of the image forming apparatuses, and a diagnosing means for diagnosing the interface unit and the transmission path when the power of each of the image forming devices is turned on.

According to the above-mentioned invention, each of the image forming apparatuses individually checks the interface unit when a power of each of the image forming apparatuses is turned on. Thus, if a malfunction occurs in one of the image forming apparatuses, the malfunction is found before establishing the transmission path. Additionally, a position of the malfunction is easily located.

In one embodiment of the present invention, the diagnosing means may diagnose the interface unit in accordance with a cyclic redundancy check (CRC) error detection method.

The diagnosing means may include a linear feedback shift register generating pseudo image data including random numbers having a long period, a CRC data adding unit adding cyclic redundancy check data to the pseudo image data, and an error detecting unit for detecting errors in the pseudo image data in accordance with the CRC error detection method.

Additionally, the diagnosing means may be provided to each of the image forming apparatuses.

Additionally, the liner feedback shift register may output the pseudo image data to a line through which the image data is transmitted.

Further, the interface unit may perform a half-duplex communication, and the pseudo image data may be returned immediately before being forwarded to the transmission path.

Additionally, the interface unit may perform a full-duplex communication, and a relay switch may be provided between the interface unit and the transmission path so that the pseudo image data is returned immediately before being forwarded to the transmission path by closing the relay switch.

Additionally, in the image forming system according to the present invention, a connection mode may be provided in which at least first and second image forming apparatuses from among the image forming apparatuses are connected so that image data generated by the first image forming apparatus is transmitted to the second image forming apparatus, and the diagnosing means performs a diagnosing operation after a power of each of the first and second image forming apparatuses is turned on and when the connection mode is designated through one of the first and second image forming apparatuses.

According to this invention, the transmitting operation of the image data is performed when the connection mode is designated. Thus, a presence of a malfunction in the image forming system including the transmission path can be checked before actually transmitting image data in the connection mode.

In one embodiment of the present invention, the diagnosing means may be provided to each of the first and second image forming apparatuses, and each of the first and second image forming apparatuses may include a linear feedback shift register generating pseudo image data including random numbers having a long period, a CRC data adding unit adding cyclic redundancy check data to the pseudo image data, and an error detecting unit for detecting errors in the pseudo image data in accordance with the CRC error detection method. In this embodiment, the connection mode is designated through the first image forming apparatus, the first image forming apparatus transmits the pseudo image data to the second image forming apparatus through the transmission path, and the second image forming apparatus performs a CRC error detection in accordance with the pseudo image data received from the first image froming apparatus.

Additionally, after the CRC error detection is performed in the second image forming apparatus, the second image forming apparatus may transmit the pseudo image data to the first image forming apparatus through the transmission path, and the first image forming apparatus may perform a CRC error detection in accordance with the pseudo image data received from the second image forming apparatus.

Additionally, in the image forming apparatus according to the present invention, a connection mode may be provided in which at least first and second image forming apparatuses from among the image forming apparatuses are connected so that image data generated by the first image forming apparatus is transmitted to the second image forming apparatus, and the diagnosing means may perform a diagnosing operation after the connection mode is designated through one of the first and second image forming apparatuses and when a start of an image forming operation according to the connection mode is designated.

According to this invention, a diagnosis of the image forming system including the transmission path is performed immediately before an actual transmission of the image data. Thus, a reliable image data transmitting operation can be performed.

In the above-mentioned invention, the diagnosing means may be provided to each of the first and second image forming apparatuses, and each of the first and second image forming apparatuses may include a linear feedback shift register generating pseudo image data including random numbers having a long period, a CRC data adding unit adding cyclic redundancy check data to the pseudo image data, and an error detecting unit for detecting errors in the pseudo image data in accordance with the CRC error detection method. In this embodiment, when a start of an image forming operation is designated through the first image forming apparatus, the first image forming apparatus transmits the pseudo image data to the second image forming apparatus through the transmission path, and the second image forming apparatus performs a CRC error detection in accordance with the pseudo image data received from the first image forming apparatus.

Additionally, after the CRC error detection is performed in the second image forming apparatus, the second image forming apparatus transmits the pseudo image data to the first image forming apparatus through the transmission path, and the first image forming apparatus may perform a CRC error detection in accordance with the pseudo image data received from the second image forming apparatus.

Accordingly, if the transmission from the first image forming apparatus to the second image forming apparatus cannot be performed, the transmission from the second image forming apparatus to the first image forming apparatus is attempted. Then, if the transmission from the second image forming apparatus to the first image forming apparatus can be performed, such a use can be suggested to a user. Additionally, if the transmission in both directions cannot be performed, the first image forming apparatus may perform an image forming operation alone.

Other objects, features and advantages of the present invention will become more apparent from the following detailed description when read in conjunction with the accompanying drawings.

BRIEF DESCRIPTION OF THE DRAWINGS

FIG. 10 is an illustration for explaining a variation of the second embodiment in which a transmission path between a master apparatus and a slave apparatus is a full duplex communication line.

DETAILED DESCRIPTION OF THE PREFERRED EMBODIMENTS

A description will now be given of a first embodiment of the present invention.

Figure 1:
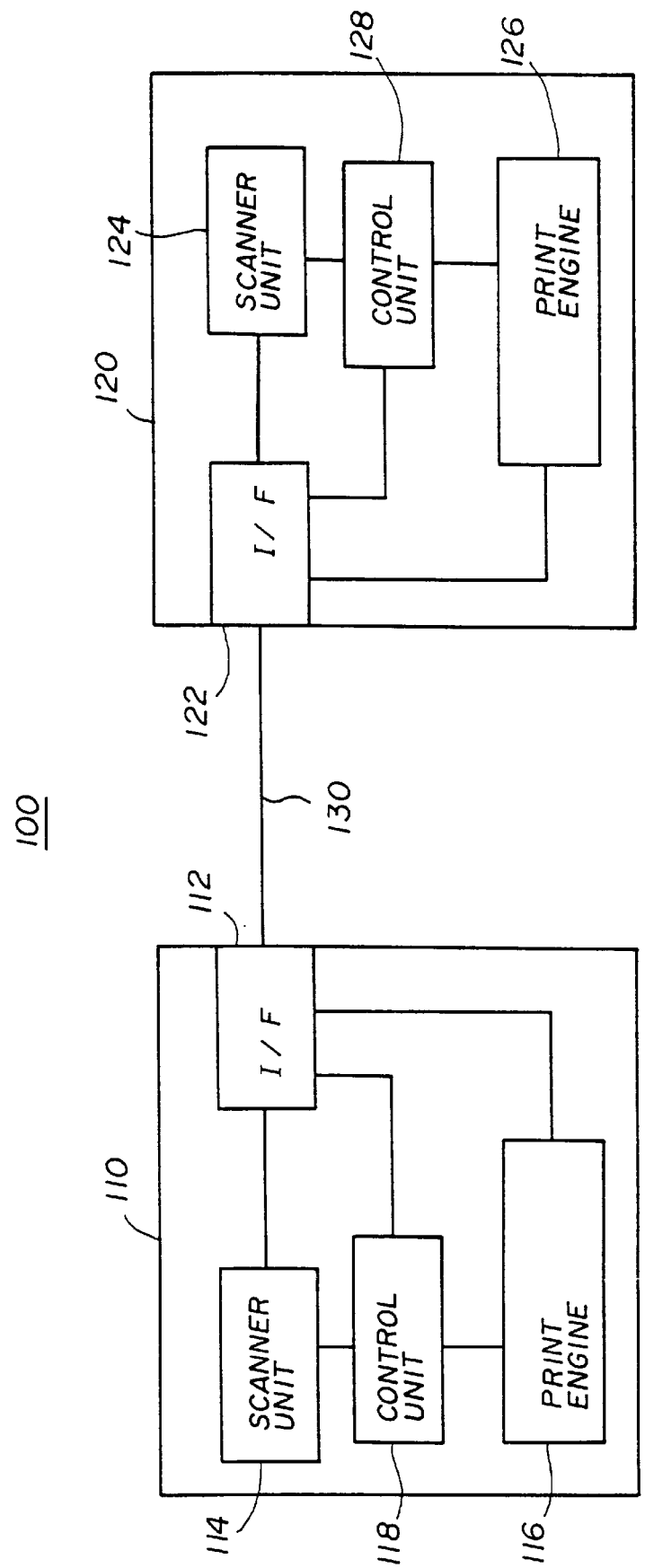
FIG. 1 is an illustration of a digital copy system according to a first embodiment of the present invention

FIG. 1 is an illustration of a digital copy system 100 according to the first embodiment of the present invention. In the digital copy system 100 shown in FIG. 1, a digital copy machine 110 is connected to a digital copy machine 120 via a transmission cable 130 so that image data can be transmitted therebetween. Specifically, a transmission interface 112 of the digital copy machine 110 is connected to a transmission interface 122 of the digital copy machine 120 via the transmission cable 130. The communication between the digital copy machines 110 and 120 may be a half-duplex communication or a full-duplex communication.

The digital copy machine 110 as an image forming apparatus includes a scanner unit 114, a print engine 116 and a control unit 118. The scanner unit 114 scans an original document to generate image data. The print engine 116 prints an image according to the image data. The transmission interface 112, the scanner unit 114 and the print engine 116 are controlled by the control unit 118. Similarly, the digital copy machine 120 as an image forming apparatus includes a scanner unit 124, a print engine 126 and a control unit 128. The scanner unit 124 scans an original document to generate image data. The print engine 126 prints an image according to the image data. The transmission interface 122, the scanner unit 124 and the print engine 126 are controlled by the control unit 128.

In the above-mentioned digital copy system, the image data generated in the digital copy machine 110 can be transmitted to the digital copy machine 120 via the transmission cable 130 so that the digital copy machine 120 can form an image according to the image data transmitted from the digital copy machine 110. Such an operational mode is referred to as a connection copy mode. The connection copy mode can be set by either the digital copy machine 110 or 120. Specifically, the connection copy mode can be set by an operator by pressing a connection copy mode key provided on each of the digital copy machines 110 and 120. When the connection copy mode is set through the digital copy machine 110, the image data is transmitted from the digital copy machine 110 to the digital copy machine 120. In this case, the digital copy machine 110 may be referred to as a master device and the digital copy machine 120 may be referred as a slave device. On the other hand, when the connection copy mode is set through the digital copy machine 120, the image data is transmitted from the digital copy machine 120 to the digital copy machine 110. In this case, the digital copy machine 120 may be referred to as a master device and the digital copy machine 110 may be referred as a slave device.

It should be noted that although the above-mentioned digital copy system as an image forming system includes two image forming apparatuses such as the digital copy machines 110 and 120, more than three image forming apparatuses may be connected in series or in a star-like connection.

Figure 2:
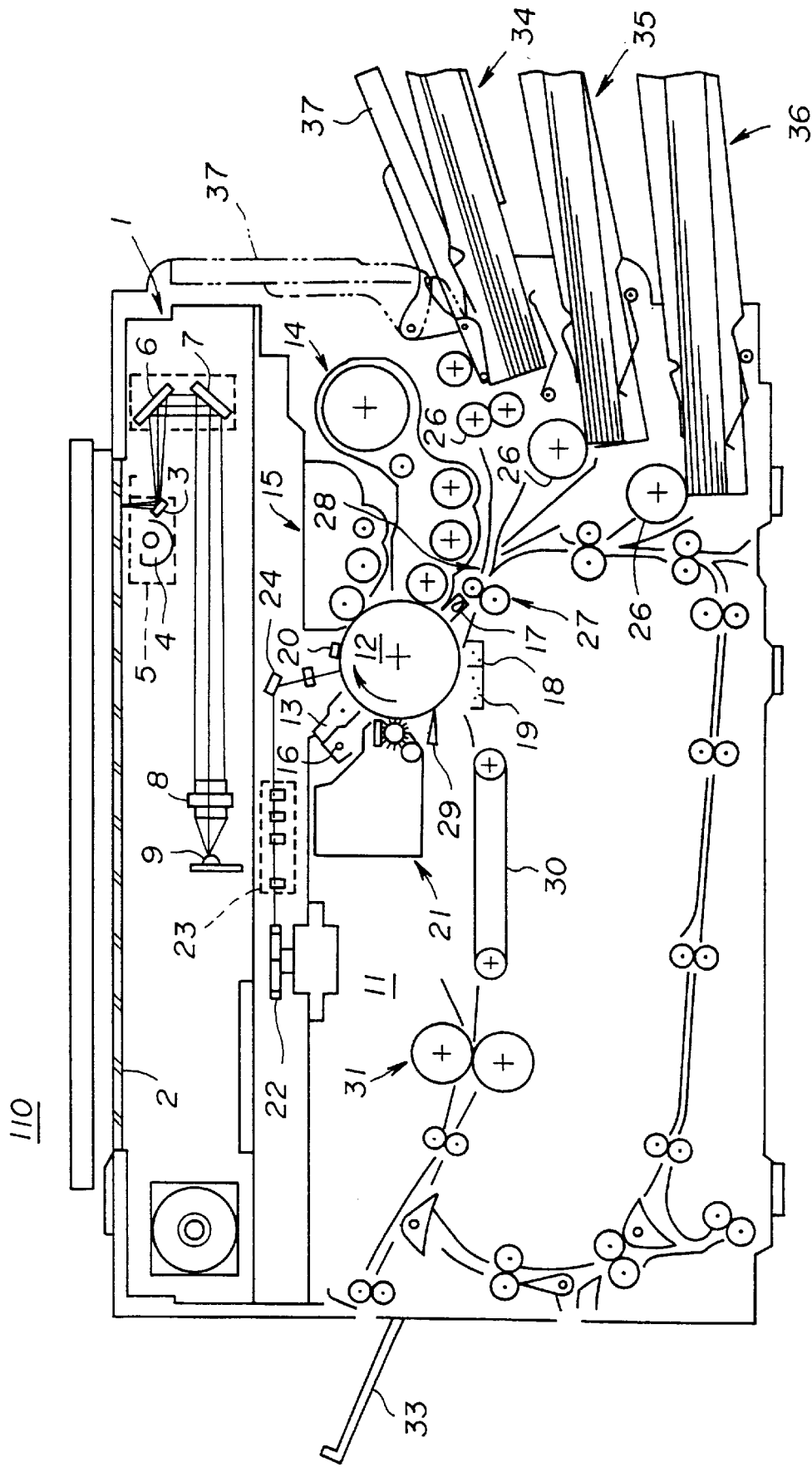
FIG. 2 is an illustration of a structure of a digital copy machine shown in FIG. 1.

FIG. 2 is an illustration of a structure of the digital copy machine 110 shown in FIG. 1. It should be noted that the digital copy machine 120 shown in FIG. 1 has the same structure as the digital copy machine 110, and descriptions thereof will be omitted.

As shown in FIG. 2, the digital copy machine 110 has a contact glass 2 on which an original sheet is placed when the original sheet is scanned. A carrier 5 having a light source 4 moves under the contact glass 2. A mirror 3 is also provided on the carrier 5 so that a light, which is projected from the light source 4 and reflected by the original sheet on the contact glass 2, is deflected in a horizontal direction. The light deflected by the mirror 3 is deflected by mirrors 6 and 7 so that the light is deflected 180 degrees. The light deflected by the mirrors 6 and 7 enters a lens 8, and is focused on a line image sensor 9 by the lens 8.

Figure 3:
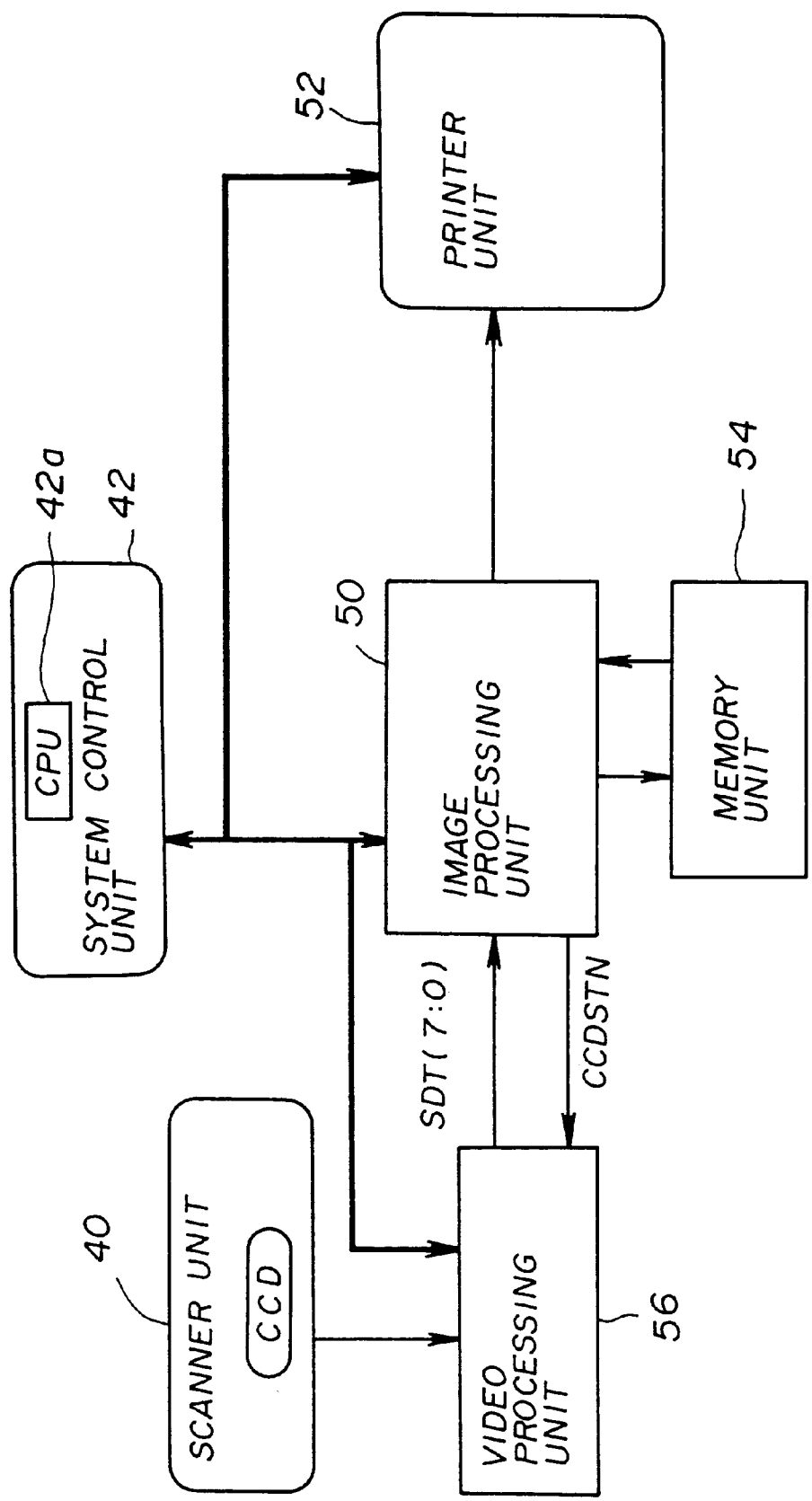
FIG. 3 is a system structure diagram of an electric part of the digital copy machine shown in FIG. 1.

A description will now be given, with reference to FIG. 3, of a system structure of an electric part of the digital copy machine 110. FIG. 3 is a system structure diagram of the electric part of the digital copy machine 110.

In FIG. 3, an image signal generated by a charge coupled device (CCD) 40a provided in a scanner unit 40 is provided to a video processing unit 56. The video processing unit 56 provides an appropriate gain to the image signal, and subjects the image signal to an A/D conversion. Then, the image signal is output as 8-bit digital data SDT(7:0) in synchronization with a clock signal CK1 which has a frequency of 20 MHz. An image processing unit 50 provides the clock signal CK1 to the video processing unit 56. Additionally, the image processing unit 50 provides a timing signal CCDSTN to the video processing unit 56. The timing signal CCDSTN is used for determining a timing of a reading operation of the CCD 40a.

The image processing unit 50 performs various operations such as a black offset correction, a shading correction, an MTF correction, a γ-correction and a dither process or an error diffusion process. The 8-bit digital image data SDT (7:0) processed by the image processing unit 50 is provided to a printer unit 52.

It should be noted that operations of the video processing unit 56, the image processing unit 50 and the printer unit 52 are controlled by a system control unit 42.

Referring to FIG. 2, in the printer unit 52, an optical system 23 focuses a laser beam emitted by a laser generator 22 on a predetermined position. A laser beam output by the optical system 23 is reflected by a reflection mirror 24 so that the reflected laser beam is projected onto a photosensitive drum 12. The photosensitive drum 12 is uniformly charged by a charger 20 before it is exposed to the laser beam. A static latent image formed by the laser beam is developed by toner in a developing unit 14. A transfer paper is feed to a transfer position by a register roller 27 at an appropriate timing. A plurality of transfer papers are stored in cassettes 34, 35 and 36. The transfer papers stored in each of the cassettes 34, 35 and 36 are selectively fed by the respective feed rollers 26. The toner image formed on the photosensitive drum 12 is transferred onto the transfer paper by a transfer charger 28. Toner remaining on the photosensitive drum 12 is removed by a cleaning unit 21. After the transfer of the toner image is completed, the transfer paper is separated from the photosensitive drum 12 by a separation charger 19. The separated transfer paper is conveyed by a conveyance belt 30, and the transferred toner image is fixed by a fixing unit 31. The transfer paper passed through the fixing unit 31 is ejected onto an eject tray 33.

Figure 4:
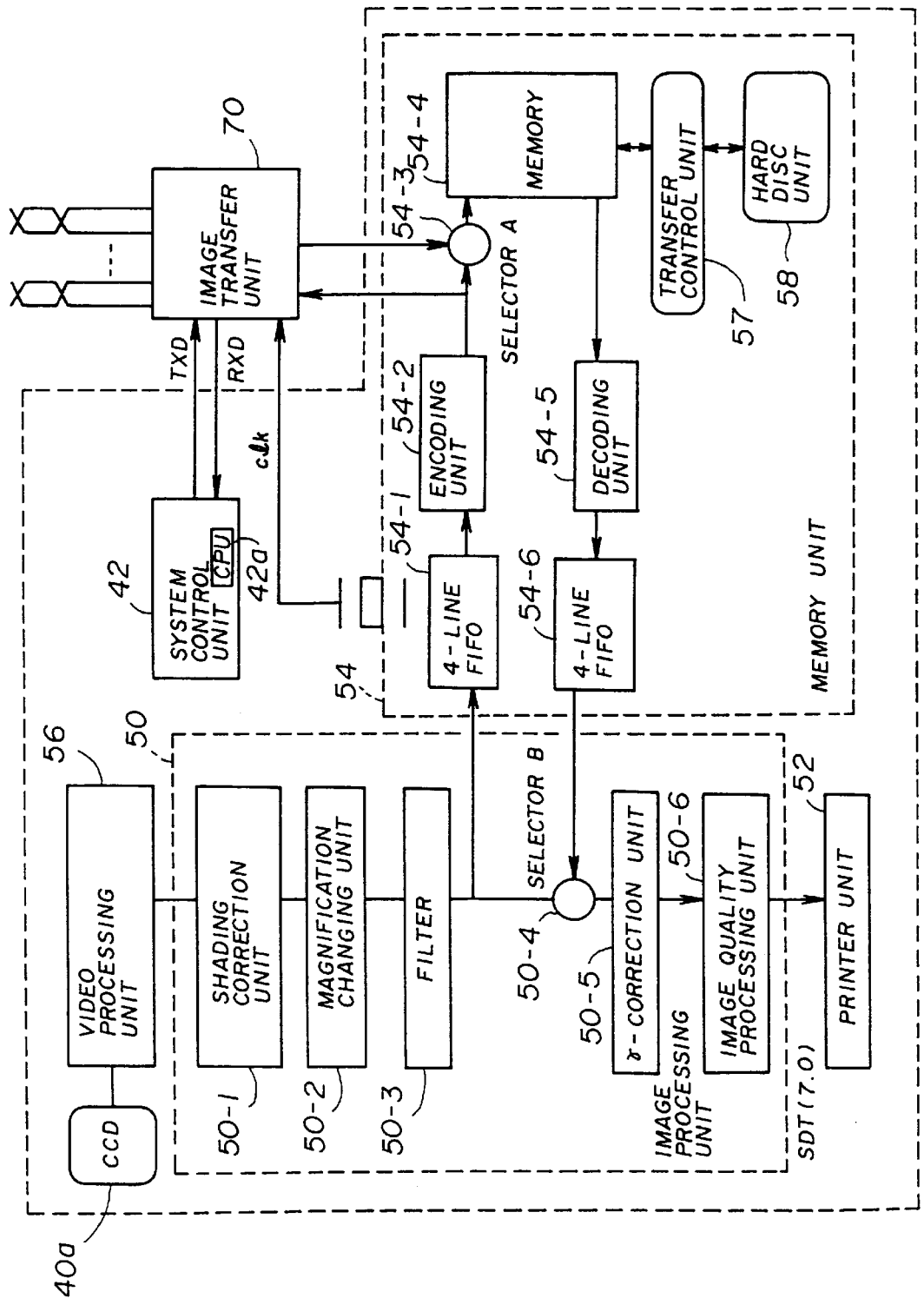
FIG. 4 is a block diagram of the electric part shown in FIG. 3.

A description will now be given, with reference to FIG. 4, of a copying operation of the digital copy machine 110. FIG. 4 is a block diagram of the image forming unit shown in FIG. 3.

When an original document is read in a regular reading mode, the original document is placed on the contact glass 2 and a start button (not shown in the figure) is pressed. By pressing the start button, a scan start signal is output from a CPU 42a provided in the system control unit 42 to the image processing unit 50. Thereby, a signal FGATEN indicating an effective range of an image in the sub-scanning direction is changed to an active state. Thus, the carrier 5 starts to move in the leftward direction in the figure, and the sub-scanning is performed.

The light (read light) reflected by the original document reaches the line image sensor 9 via the mirror 3, the mirror 6, the mirror 7 and the lens 8, in that order. The CCD 40a of the line image sensor 9 converts the incident light into an electric signal. The electric signal is A/D converted into digital image data by the video processing unit 56 and provided to the image processing unit 50. The digital image data is subjected to a shading correction by the shading correction unit 50-1, and, then, the digital image data is subjected to a magnification changing process by a magnification changing unit 50-2. After that, the digital image data is subjected to an appropriate filtering process by a filter 50-3. The digital image data is then provided to a γ-correction unit 50-5 via a selector B 50-4 so as to be subjected to a γ-correction. Thereafter, the digital image data is subjected to an image quality process such as a dither process or an error diffusion process by the image quality processing unit 50-6, and the digital image data is provided to the printer unit 52 is started.

In the above-mentioned regular copy mode, a start signal DFGATEN for starting a printing operation is turned to an active state, and a printing operation based on the digital image data provided to the printer unit 52.

A description will now be given, with reference to FIG. 4, of a structure of the memory unit 54.

The digital copy machine 110 can compress the digital image data, and the compressed image data can be transferred to other image forming apparatuses such as the digital copy machine 120 via an image transfer unit 70 while decoding the compressed digital image data so as to output an image based on the decoded digital image data. In such a case, the digital image after being filtered by the filter 50-3 is provided to a 4-line FIFO 54-1 of the memory unit 54. The 4-line FIFO stores the digital image data corresponding to 4 lines so as to form a 4×4 pixel matrix. Each 4×4 pixel matrix is sequentially provided to an encoding unit 54-2 so as to be encoded, and the encoded data is provided to a memory 54-4 such as a DRAM via a selector A 54-3 and is stored in the memory 54-4. The data stored in the memory 54-4 is provided to a hard disc unit 58 by a transfer control unit 57. The image data transferred to the hard disc unit 58 is stored on an individual original document basis. Accordingly, the image data stored in the hard disc unit 58 can be read out on an individual original document basis.

The image data read from the hard disc unit 58 is temporarily stored in the memory 54-4, and is sent to a decoding unit 54-5 so as to be decoded. The decoded image data is provided to a 4-line FIFO 54-6. The 4-line FIFO 54-6 stores the encoded image data corresponding to 4 lines, and sends the encoded image data to the selector B 50-4 of the image processing unit 50.

When the image data is transferred to other image forming apparatuses, the image data is provided to the image transfer unit 70 immediately after the image data is encoded by the encoding unit 54-2. When the image data is received from other image forming apparatuses, the image data sent from other image forming apparatuses is input to the selector A 54-3 via the image transfer unit 70 so that the input image data is stored in the memory 54-4.

In the present embodiment, when the image data is transferred to the digital copy machine 120, the image data is transferred to the image transfer unit 70 while the image data is stored in the memory 54-4 and subsequently stored in the hard disc unit 58 by switching the selector A 54-3 so that the image data is forwarded from the encoding unit 54-2 to the memory 54-4. On the other hand, the selector A 54-3 is switched so that the image data is transferred from the image transfer unit 70 to the memory 54-4.

Figure 5:
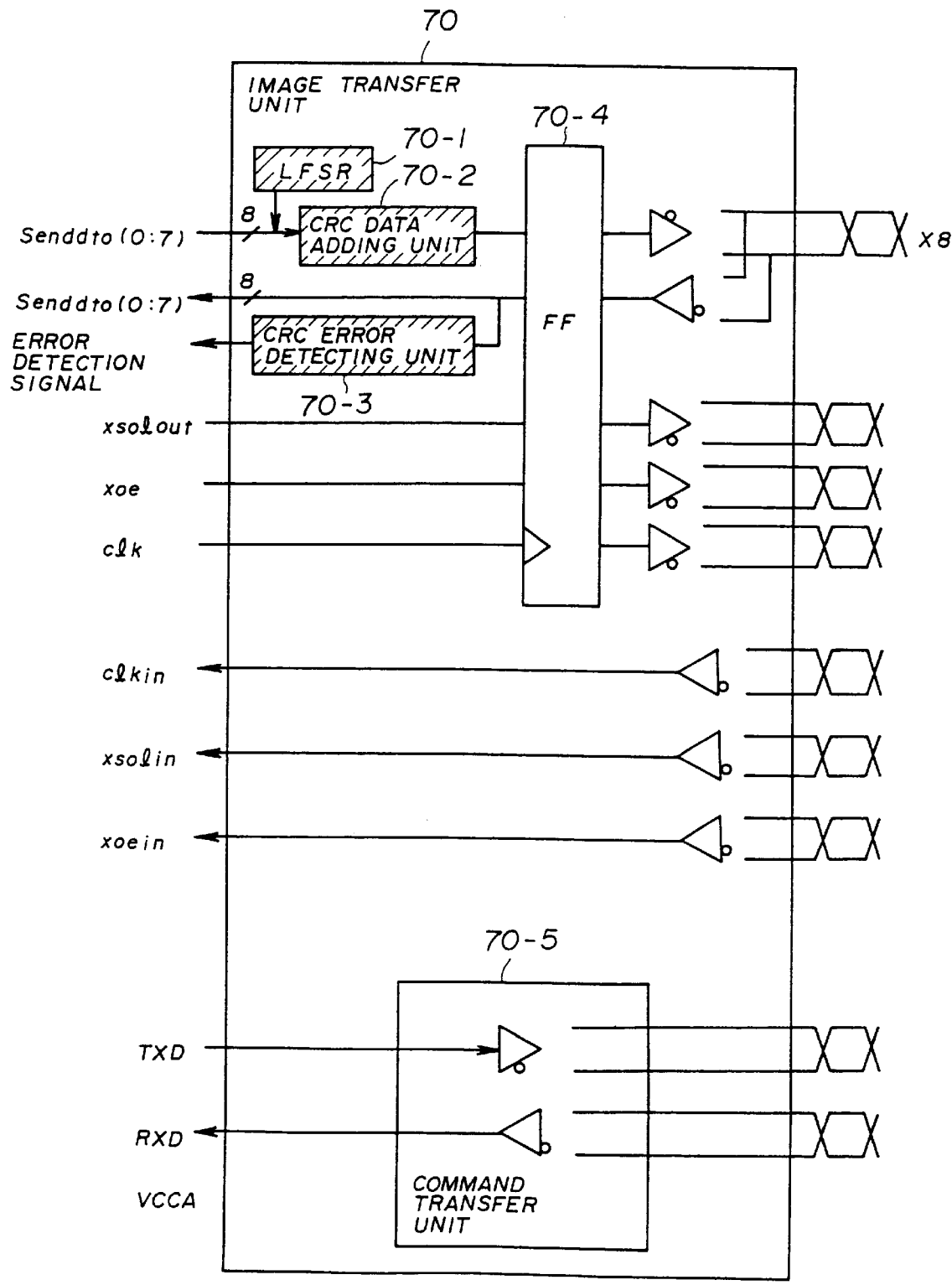
FIG. 5 is a block diagram of an image transfer unit shown in FIG. 4.

A description will now be given, with reference to FIG. 5, of a structure of the image transfer unit 70. FIG. 5 is a block diagram of the image transfer unit 70 shown in FIG. 4.

The image transfer unit 70 is provided for transferring the image data encoded by the encoding unit 54-2 to other image forming apparatuses such as the digital copy machine 120. In the present embodiment, the transmitter-side apparatus sends the image data to the receiver-side apparatus via RS-422 by synchronizing the image data to be transmitted with a reference clock clk by a flip-flop 70-4 as shown in FIG. 5. The image transfer unit 70 of the receiver side apparatus receives image data by a differential-type receiver, and transfer the received image data to the memory unit 54 via a single stage buffer.

Figure 6:
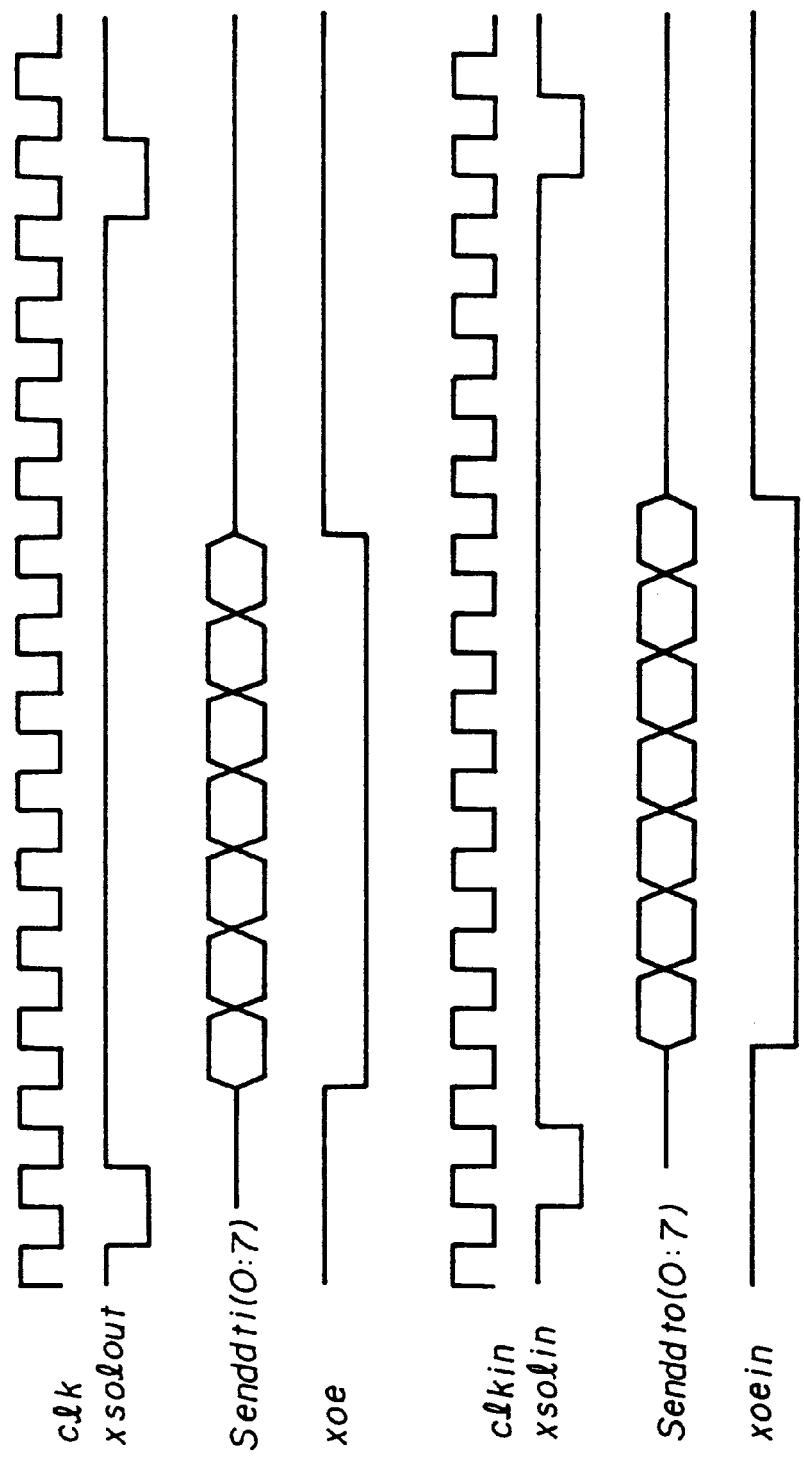
FIG. 6 is a time chart of signals transmitted between a transmitter-side apparatus and a receiver-side apparatus.

The data to be transmitted includes, as shown in FIG. 6, the clock signal clk, the encoded (compressed) image data senddti(7:0), a signal xsolout and a signal xoe. The image data senddti(7:0) is encoded (compressed) in synchronization with the clock signal clk. The signal xsolout indicates a head of the data to be transmitted, and the signal xoe indicates a range of the data to be transmitted. The receiver side apparatus receives the clock signal clk, the image data senddti(7:0), the signal xsolout and the signal xoe as a clock signal clkin, image data senddto, a signal xsolin and a signal xoein, respectively.

Additionally, in the present embodiment, a command transfer unit 70-5 comprising a transmission buffer and a reception buffer is provided in the image transfer unit 70. The transmission buffer transmits a signal TXD to the receiver-side apparatus, and the reception buffer receives a signal RXD received from the receiver side apparatus. The signals TXD and RXD are used for transmitting control commands between the transmitter side apparatus and the receiver-side apparatus through a low-speed serial communication.

Further, the image transfer unit 70 is provided with a linear feedback shift register (LFSR) 70-1, a CRC data adding unit 70-2 and a CRC error detecting unit 703. The LFSR 70-1 is a known shift register comprising a plurality of flip-flops and feedback loops so that random numbers having a long period can be output by a simple hardware configuration. The CRC data adding unit 70-2 is provided to a line through which the image data is transmitted so as to add a cyclic redundancy code to data generated by the LFSR 70-1. The CRC error detecting unit 70-3 detects errors in the received image data by using a known CRC error detection method.

In the present embodiment, the data generated by the LFSR 70-1 is sent through the image data line as pseudo image data after the CRC data is added thereto. Since a transmitting buffer and a receiving buffer are provided, the data generated by the LFSR 70-1 and output from the transmitting buffer is returned to the receiving buffer immediately after the data is output form the transmitting buffer so that a CRC error detection can be performed with the returned data. Accordingly, in the present embodiment, a check for presence of a malfunction in the image data line before and after the transmission path between the transmitter-side apparatus and the receiver-side apparatus can be performed.

Since the data output by the LFSR 70-1 has various patterns which can represent image data to be transmitted between the transmitter-side apparatus and the receiver side apparatus, the digital copy machine 110 according to the present embodiment can perform the CRC error check prior to transmitting true image data.

Figure 7:
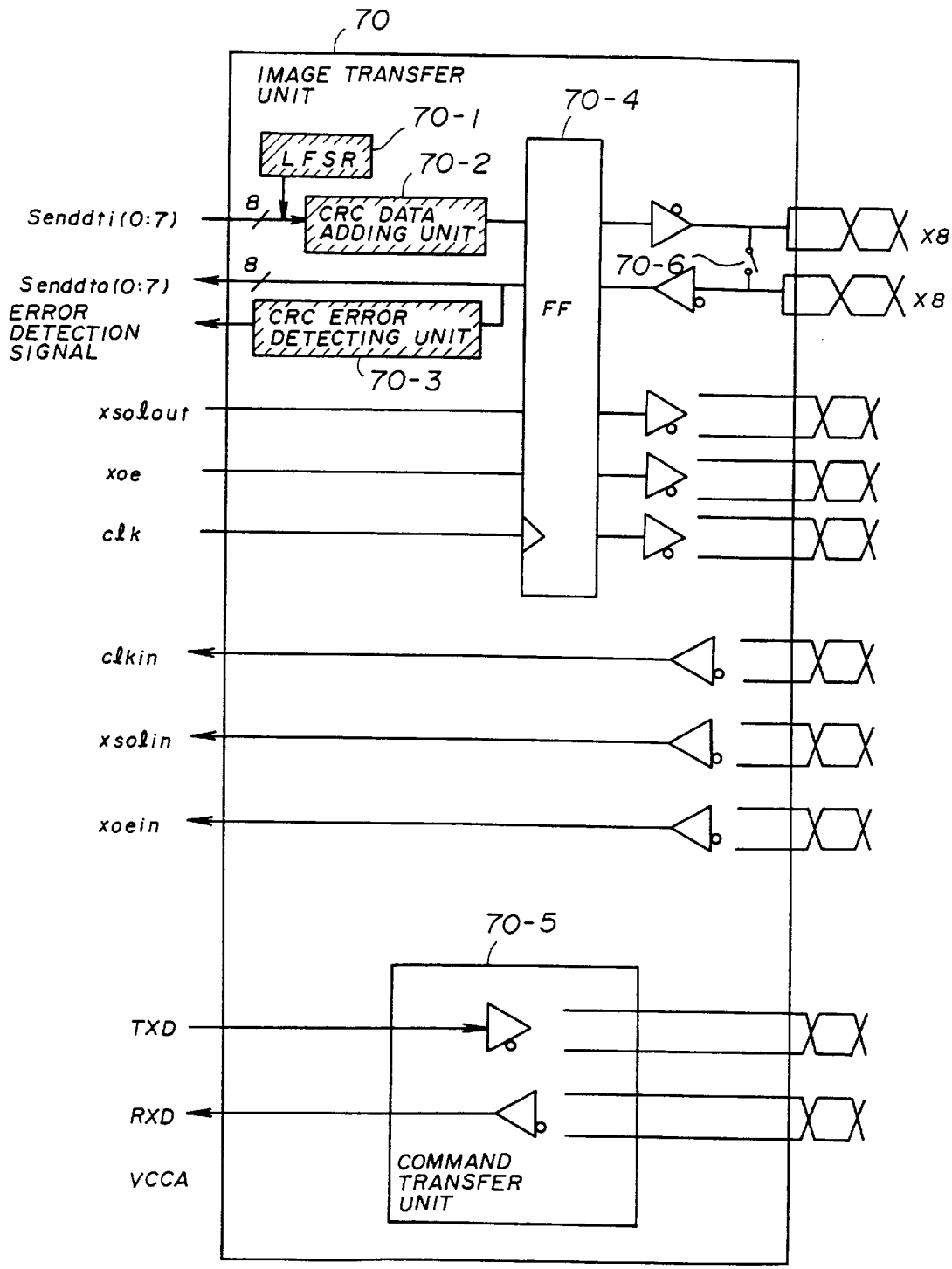
FIG. 7 is a block diagram of an image transfer unit adapted to perform a full-duplex communication.

In the present embodiment, the communication between the transmitter-side apparatus and the receiver-side apparatus is a half-duplex communication. However, the present invention may be applied to an image forming system using a full-duplex communication by using a relay switch 70-6 as shown in FIG. 7. That is, the data output from the transmitting buffer is immediately returned to the receiving buffer by closing the relay switch 70-6 so that the transmission line is connected to the reception line immediately after the transmitting buffer.

Figure 8:
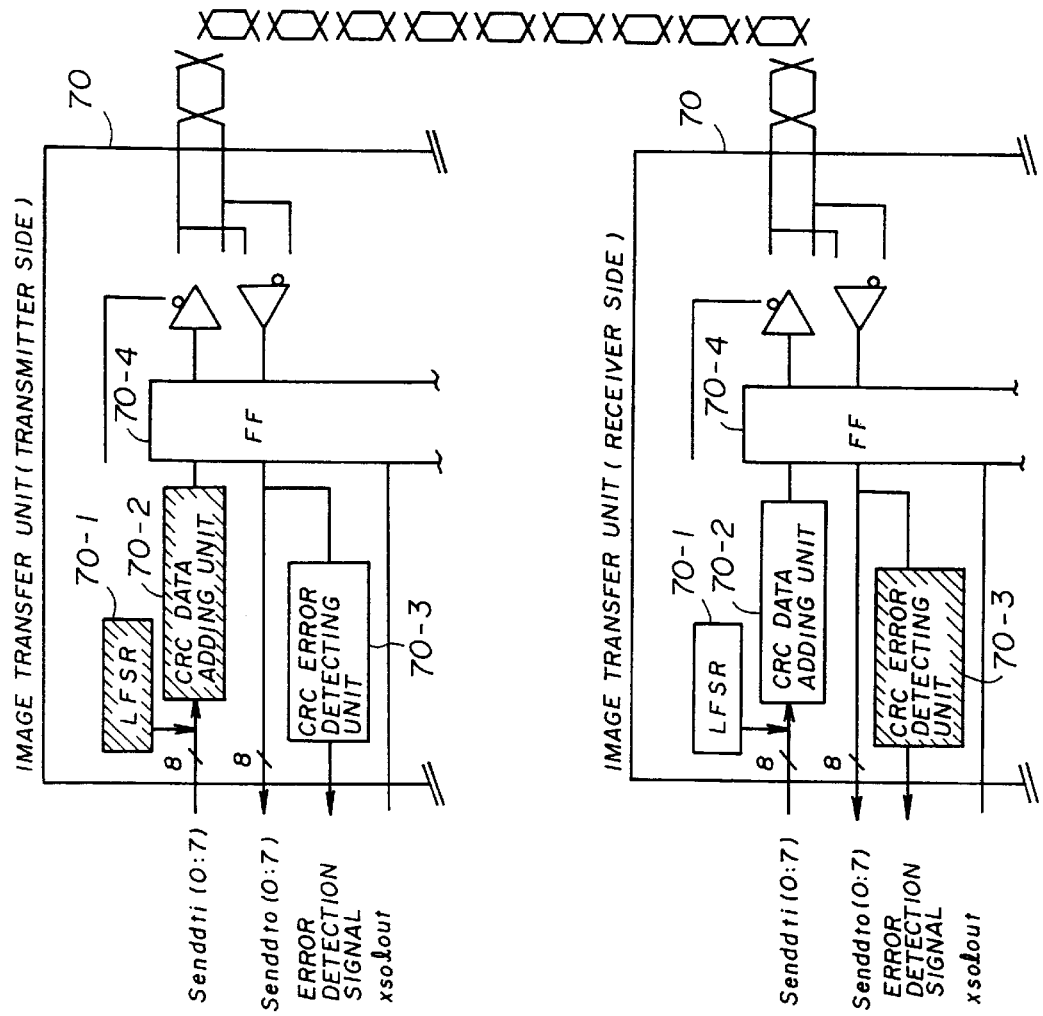
FIG. 8 is an illustration of the image transfer unit of a transmitter-side apparatus and a part of the image transfer unit of a receiver-side apparatus for explaining a second embodiment of the present invention.

A description will now be given, with reference to FIG. 8, of a second embodiment of the present invention. FIG. 8 is an illustration of the image transfer unit of a transmitter-side apparatus and a part of the image transfer unit of a receiver-side apparatus for explaining the second embodiment of the present invention. In FIG. 8, parts that are the same as the parts shown in FIG. 7 are given the same reference numerals, and descriptions thereof will be omitted.

In the second embodiment, similar to the above-mentioned first embodiment, the CRC data is added to the pseudo image data generated by the LFSR 70-1. The pseudo image data is transmitted to the image forming apparatus (digital copy machine 120) via a transmission path (transmission cable 130). The image transfer unit 70 of the receiver-side apparatus (digital copy machine 120) receives the pseudo image data, and performs a CRC error detection using the pseudo image data having the CRC data added by the CRC data adding unit 70-2 of the image transfer unit 70 of the transmitter-side apparatus (digital copy machine 110).

Thereafter, the pseudo image data generated by the LFSR 70-1 of the image transfer unit 70 of the receiver-side apparatus (digital copy machine 120) is transmitted to the transmitter-side apparatus (digital copy machine 110), and a CRC error detection is performed by the CRC error detecting unit 70-3 of the image transfer unit 70 of the transmitter-side apparatus (digital copy machine 110).

In the present embodiment, the above-mentioned CRC checking operation is started when a power of one of the image forming apparatuses has been turned on, a power of the other image forming apparatus is turned on and the CRC error detection for both the image forming apparatuses is completed. The image forming apparatus turned on first becomes a master apparatus, and the image forming apparatus turned on later becomes a slave apparatus. Accordingly, in the present embodiment, the CRC error detection including the checking of the transmission path is performed when a power of the slave apparatus is turned on and the CRC error checking of the slave apparatus itself is completed.

Figure 9:
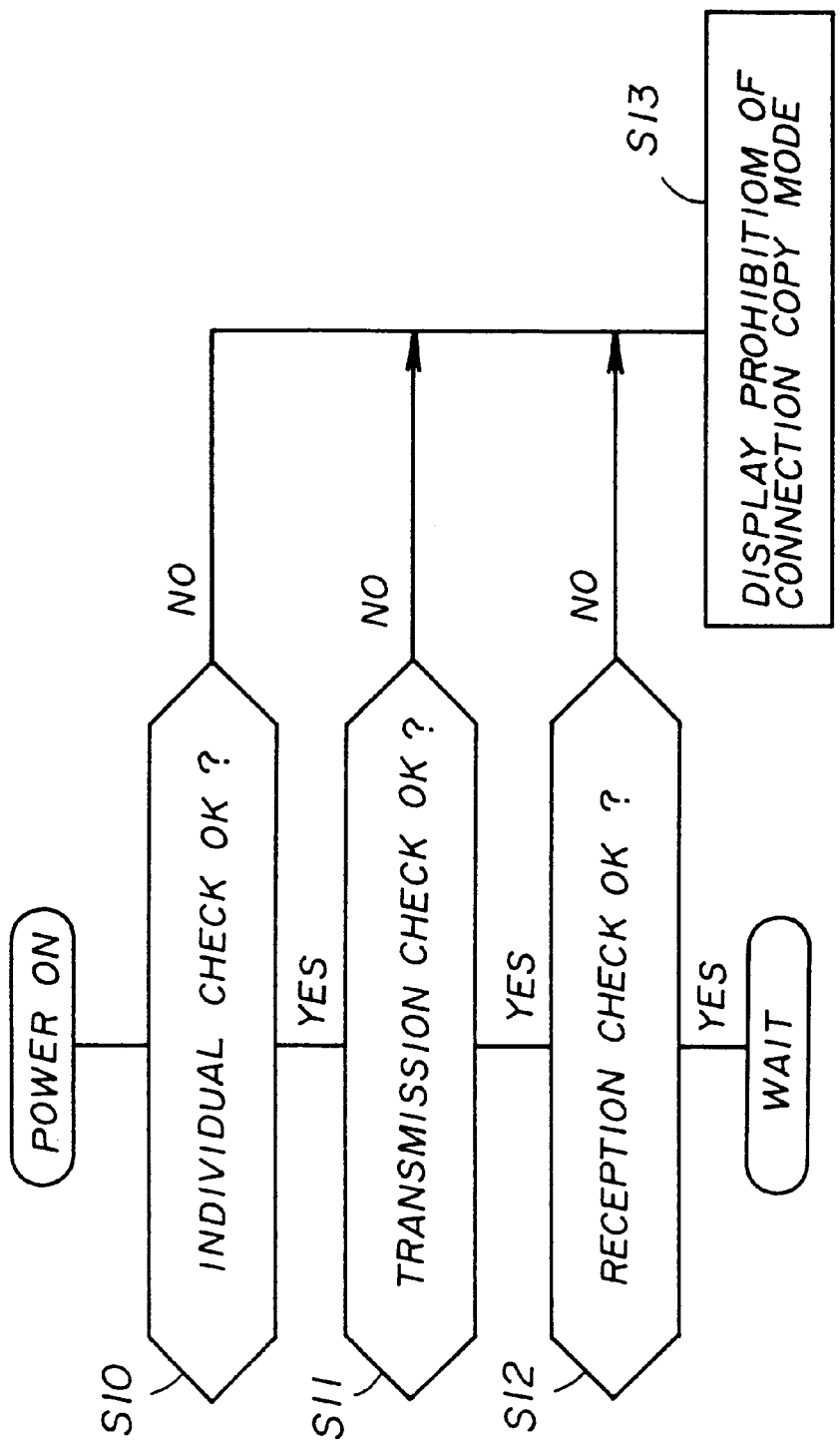
FIG. 9 is a flowchart of an operation which is controlled by a CUP of a system control unit of a master apparatus in the second embodiment.

FIG. 9 shows a flowchart of the above-mentioned operation which is controlled by the CPU 42a of the system control unit 42 of the master apparatus.

When a power of the slave apparatus is turned on, it is determined, in step S10, whether or not the check for the slave apparatus itself has been completed. If it is determined that the check for the slave apparatus itself has been completed, the routine proceeds to step S11. In step S11, it is determined whether or not a result of the check for transmission from the master apparatus to the slave apparatus is good. If it is determined that the result is good, the routine proceeds to step S12. In step S12, it is determined whether or not a result of the check for transmission from the slave apparatus to the master apparatus is good. If it is determined that the result is good, the routine is ended. On the other hand, if one of the determinations of steps S10, S11 and S12 is negative, it is determined that a malfunction occurs in one of the master apparatus, the slave apparatus and the transmission path between the master apparatus and the slave apparatus. Accordingly, in such a case, the routine proceeds to step S13 so as to indicate a prohibition of use of a connection mode on an operational panel. Thus, an operator can recognize that the connection mode cannot be used.

FIG. 10 shows a variation of the second embodiment in which variation the transmission path between the master apparatus and the slave apparatus is a full-duplex communication line. In this case, the check of the transmission from the master apparatus to the slave apparatus and the check of the transmission from the slave apparatus to the master apparatus can be performed at the same time.

A description will now be given of a third embodiment of the present invention. A structure of an image forming system according to the third embodiment is the same as the above-mentioned first and second embodiments, and descriptions thereof will be omitted.

In the third embodiment, the CRC error detection is performed when an operator designates the connection copy mode or a copy start button is pressed after the connection copy mode is designated. The operator designates the connection copy mode through an operational panel of one of the connected image forming apparatuses (digital copy machines 110 and 120). One of the image forming apparatus through which the connection copy mode is designated becomes a master apparatus, and the other one of the image forming apparatus becomes a slave apparatus.

In the master apparatus, the CRC data is added to the pseudo image data generated by the LFSR 70-1. The pseudo image data is transmitted to the image forming apparatus via a transmission path. The image transfer unit 70 of the slave apparatus (digital copy machine 120) receives the pseudo image data, and performs a CRC error detection using the pseudo image data having the CRC data added by the CRC data adding unit 70-2 of the image transfer unit 70 of the master apparatus.

If no error is found in the CRC error detection performed by the slave apparatus, the slave apparatus sends a notification that the transmission of image data from the master apparatus to the slave apparatus can be performed in a normal condition. Then, the master apparatus starts a connection copying operation in which image data is transferred to the master apparatus to the slave apparatus.

On the other hand, if an error is found by the CRC error detection, the pseudo image data is transmitted from the slave apparatus to the master apparatus so as to perform a CRC error detection in the master apparatus. If no error is found at this time, a notification is set to the operator to switch the master apparatus and the slave apparatus to each other. If an error is found again at this time, a prohibition of using the connection copy mode is indicated on an operational panel and a copying operation is performed by the master apparatus alone.

Figure 11:
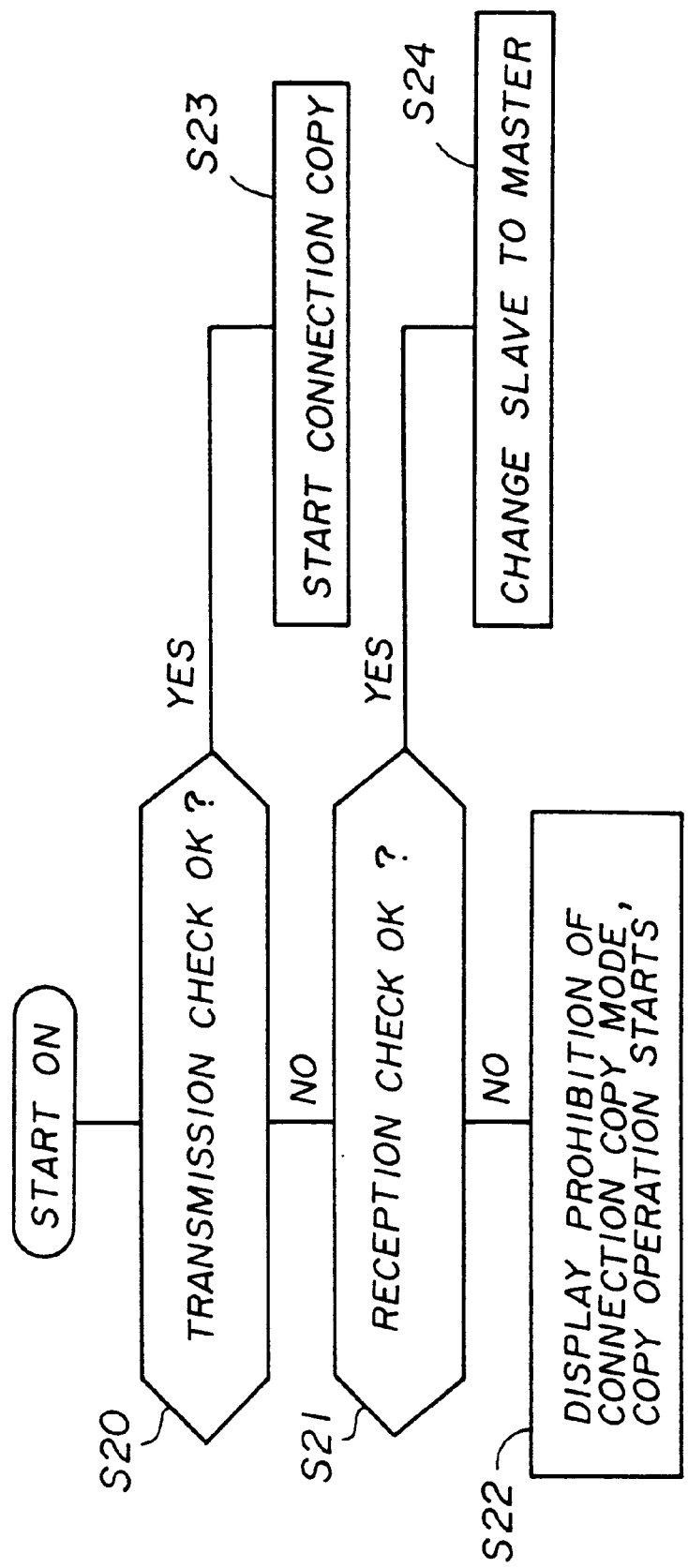
FIG. 11 is a flowchart of an operation which is controlled by a CUP of a system control unit of a master apparatus in a third embodiment.

FIG. 11 shows a flowchart of the above-mentioned operation which is controlled by the CPU 42a of the system control unit 42 of the master apparatus.

When a connection copy start button of the master apparatus is pressed, it is determined, in step S20, whether or not a result of checking of the transmission from the master apparatus to the slave apparatus is good. If it is determined that the result of checking is good, the routine proceeds to step S23. In step S23, the connection copying operation is started On the other hand, if the result of checking is not good, that is, if an error is found in the CRC error detection, the routine proceeds to step S21. In step S21, it is determined whether or not a result of checking of the transmission from the slave apparatus to the master apparatus is good. If it is determined that the result is good, the routine proceeds to step S24. In step S24, a message is provided to the operator that the master apparatus and the slave apparatus should be switched. On the other hand, if the result is not good, that is, if an error is found by the CRC error detection, a prohibition of using the connection copy mode is indicated on the operational panel and a copying operation is performed by the master apparatus alone.

The present invention is not limited to the specifically disclosed embodiments, and variations and modifications may be made without departing from the scope of the present invention.

The present application is based on Japanese priority application No. 9-356204 filed on Dec. 8, 1997, the entire contents of which are hereby incorporated by reference.

What is claimed is:

1. An image forming system comprising:
a plurality of image forming apparatuses each of which includes:
an image scanner scanning an original document so as to generate image data;
an image processing unit processing the image data generated by said image scanner;
an encoding unit encoding the image data processed by said image processing unit;
an interface unit transmitting the image data encoded by said encoding unit, said interface unit also receiving image data from one of said image forming apparatuses;
a memory unit storing the image data encoded by said encoding unit and the image data received by said interface unit;
a decoding unit decoding the image data stored in said memory unit; and
a printing unit printing an image by the image data decoded by said decoding unit;
a transmission path connecting said interface unit of each of said image forming apparatuses so that the encoded image data is transmitted between the image forming apparatuses; and
means for diagnosing any one of the interface units of any one of said plurality of image forming apparatuses and for diagnosing the transmission path when a power of each of said plurality of image forming apparatuses is turned on.

2. The image forming system as claimed in claim 1, wherein said diagnosing means diagnoses said interface unit and said transmission path in accordance with a cyclic redundancy check (CRC) error detection method.

3. The image forming system as claimed in claim 1, wherein said diagnosing means is provided to each of said image forming apparatuses.

4. The image forming apparatus as claimed in claim 1, wherein a connection mode is provided in which at least first and second image forming apparatuses from among said image forming apparatuses are connected so that image data generated by said first image forming apparatus is transmitted to said second image forming apparatus, and said diagnosing means performs a diagnosing operation when said connection mode is designated through one of said first and second image forming apparatuses.

5. The image forming apparatus as claimed in claim 1, wherein a connection mode is provided in which at least first and second image forming apparatuses from among said image forming apparatuses are connected so that image data generated by said first image forming apparatus is transmitted to said second image forming apparatus, and said diagnosing means performs a diagnosing operation after said connection mode is designated through one of said first and second image forming apparatuses and when a start of an image forming operation according to said connection mode is designated.

6. An image forming system comprising:
a plurality of image forming apparatuses each of which includes,
an image scanner scanning an original document so as to generate image data,
an image processing unit processing the image data generated by said image scanner,
an encoding unit encoding the image data processed by said image processing unit,
an interface unit transmitting the image data encoded by said encoding unit, said interface unit also receiving image data from one of said image forming apparatuses,
a memory unit storing the image data encoded by said encoding unit and the image data received by said interface unit,
a decoding unit decoding the image data stored in said memory unit, and
a printing unit printing an image by the image data decoded by said decoding unit;
a transmission path connecting said interface unit of each of said image forming apparatuses so that the encoded image data is transmitted between the image forming apparatuses; and
diagnosing means for diagnosing said interface unit and said transmission path in accordance with a cyclic redundancy check (CRC) error detection method when a power of each of said image forming apparatuses is turned on, wherein
said diagnosing means includes,
a linear feedback shift register generating pseudo image data including random numbers having a long period,
a CRC data adding unit adding cyclic redundancy check data to the pseudo image data, and
an error detecting unit detecting an error in the pseudo image data in accordance with the CRC error detection method.

7. The image forming system as claimed in claim 6, wherein said linear feedback shift register outputs the pseudo image data to a line through which the image data is transmitted.

8. The image forming system as claimed in claim 7, wherein said interface unit performs a half-duplex communication, and the pseudo image data is returned immediately before being forwarded to said transmission path.

9. The image forming system as claimed in claim 7, wherein said interface unit performs a full-duplex communication, and a relay switch is provided between said interface unit and said transmission path so that the pseudo image data is returned immediately before being forwarded to said transmission path by closing said relay switch.

10. An image forming system comprising:
a plurality of image forming apparatuses each of which includes,
an image scanner scanning an original document so as to generate image data,
an image processing unit processing the image data generated by said image scanner,
an encoding unit encoding the image data processed by said image processing unit,
an interface unit transmitting the image data encoded by said encoding unit, said interface unit also receiving image data from one of said image forming apparatuses,
a memory unit storing the image data encoded by said encoding unit and the image data received by said interface unit,
a decoding unit decoding the image data stored in said memory unit, and a printing unit printing an image by the image data decoded by said decoding unit;

a transmission path connecting said interface unit of each of said image forming apparatuses so that the encoded image data is transmitted between the image forming apparatuses; and diagnosing means for diagnosing said interface unit and said transmission path when a power of each of said image forming apparatuses is turned on, wherein a connection mode is provided in which at least first and second image forming apparatuses from among said image forming apparatuses are connected so that image data generated by said first image forming apparatus is transmitted to said second image forming apparatus, said diagnosing means performs a diagnosing operation when said connection mode is designated through one of said first and second image forming apparatuses, and said diagnosing means is provided to each of said first and second image forming apparatuses, and each of said first and second image forming apparatuses includes, a linear feedback shift register generating pseudo image data including random numbers having a long period, a CRC data adding unit adding cyclic redundancy check data to the pseudo image data, and an error detecting unit detecting an error in the pseudo image data in accordance with the CRC error detection method, wherein when said connection mode is designated through said first image forming apparatus, said first image forming apparatus transmits the pseudo image data to said second image forming apparatus through said transmission path, and said second image forming apparatus performs a CRC error detection in accordance with the pseudo image data received from said first image forming apparatus.

11. The image forming apparatus as claimed in claim 10, wherein after the CRC error detection is performed in said second image forming apparatus, said second image forming apparatus transmits the pseudo image data to said first image forming apparatus through said transmission path, and said first image forming apparatus performs a CRC error detection in accordance with the pseudo image data received from said second image forming apparatus.

12. An image forming system comprising:

a plurality of image forming apparatuses each of which includes, an image scanner scanning an original document so as to generate image data, an image processing unit processing the image data generated by said image scanner, an encoding unit encoding the image data processed by said image processing unit, an interface unit transmitting the image data encoded by said encoding unit, said interface unit also receiving image data from one of said image forming apparatuses, a memory unit storing the image data encoded by said encoding unit and the image data received by said interface unit, a decoding unit decoding the image data stored in said memory unit, and a printing unit printing an image by the image data decoded by said decoding unit;

a transmission path connecting said interface unit of each of said image forming apparatuses so that the encoded image data is transmitted between the image forming apparatuses; and diagnosing means for diagnosing said interface unit and said transmission path when a power of each of said image forming apparatuses is turned on, wherein a connection mode is provided in which at least first and second image forming apparatuses from among said image forming apparatuses are connected so that image data generated by said first image forming apparatus is transmitted to said second image forming apparatus, said diagnosing means performs a diagnosing operation after said connection mode is designated through one of said first and second image forming apparatuses and when a start of an image forming operation according to said connection mode is designated, and said diagnosing means is provided to each of said first and second image forming apparatuses, and each of said first and second image forming apparatuses includes, a linear feedback shift register generating pseudo image data including random numbers having a long period, a CRC data adding unit adding cyclic redundancy check data to the pseudo image data, and an error detecting unit detecting an error in the pseudo image data in accordance with the CRC error detection method, wherein when a start of the image forming operation is designated through said first image forming apparatus, said first image forming apparatus transmits the pseudo image data to said second image forming apparatus through said transmission path, and said second image forming apparatus performs a CRC error detection in accordance with the pseudo image data received from said first image forming apparatus.

13. The image forming apparatus as claimed in claim 12, wherein after the CRC error detection is performed in said second image forming apparatus, said second image forming apparatus transmits the pseudo image data to said first image forming apparatus through said transmission path, and said first image forming apparatus performs a CRC error detection in accordance with the pseudo image data received from said second image forming apparatus.

* * * * *